United States Patent
Ducos et al.

(10) Patent No.: US 10,479,486 B2
(45) Date of Patent: Nov. 19, 2019

(54) AIRCRAFT UNDERCARRIAGE WITH A ROTARY DRIVE ACTUATOR

(71) Applicant: SAFRAN LANDING SYSTEMS, Velizy Villacoublay (FR)

(72) Inventors: Dominique Ducos, Velizy-Villacoublay (FR); Philippe Henrion, Velizy-Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 332 days.

(21) Appl. No.: 15/633,884

(22) Filed: Jun. 27, 2017

(65) Prior Publication Data
US 2018/0001997 A1 Jan. 4, 2018

(30) Foreign Application Priority Data
Jul. 1, 2016 (FR) ...................................... 16 56315

(51) Int. Cl.
*B64C 25/10* (2006.01)
*B64C 25/14* (2006.01)
*B64C 25/26* (2006.01)
*B64C 25/34* (2006.01)

(52) U.S. Cl.
CPC .............. *B64C 25/10* (2013.01); *B64C 25/14* (2013.01); *B64C 25/26* (2013.01); *B64C 25/34* (2013.01)

(58) Field of Classification Search
CPC ......... B64C 25/10; B64C 25/14; B64C 25/26; B64C 25/34
See application file for complete search history.

(56) References Cited

U.S. PATENT DOCUMENTS

| 9,145,204 B2 * | 9/2015 | Ducos | B64C 25/26 |
| 2012/0080559 A1 * | 4/2012 | Keller | B64C 25/14 244/102 A |
| 2013/0299633 A1 * | 11/2013 | Tierney | B64C 25/26 244/102 SL |

FOREIGN PATENT DOCUMENTS

| FR | 2 946 319 A1 | 12/2010 |
| FR | 3 022 886 A1 | 1/2016 |

OTHER PUBLICATIONS

French Preliminary Search Report of French Patent Application No. 1656315, dated Mar. 1, 2017.

* cited by examiner

*Primary Examiner* — Justin M Benedik
(74) *Attorney, Agent, or Firm* — Sughrue Mion, PLLC

(57) ABSTRACT

The invention relates to an aircraft undercarriage having a leg (2) pivotally mounted on a structure of the aircraft to pivot about a pivot axis (X1) between a deployed position and a retracted position, the undercarriage including a foldable brace (3a, 3b) comprising two hinged-together elements, one of which is hinged to the leg and the other of which is hinged to the structure of the aircraft, in such a manner that when the leg is in the deployed position, the two brace elements are locked together in a substantially aligned position, the undercarriage also being provided with a rotary drive actuator (10) having an outlet shaft acting on one of the elements of the foldable brace in order to cause the leg to pivot between its two positions. The drive actuator is pivotally mounted on the structure of the aircraft to pivot about an axis of rotation (X3) of the outlet shaft, the drive actuator having a casing (12) connected by a reaction rod (13) to the leg in order to take up the torque developed by the drive actuator when driving the undercarriage.

4 Claims, 6 Drawing Sheets

AIRCRAFT UNDERCARRIAGE WITH A ROTARY DRIVE ACTUATOR

The invention relates to an aircraft undercarriage with a rotary drive actuator.

TECHNOLOGICAL BACKGROUND OF THE INVENTION

Aircraft undercarriages are known that are hinge-mounted to a structure of the aircraft to move between a deployed position and a retracted position. In the deployed position, the undercarriage is generally stabilized by a foldable brace that is coupled to the undercarriage and to the structure of the aircraft, and that comprises two elements that are hinged to each other and that are held in an aligned position. In order to enable the undercarriage to be raised, the elements of the foldable brace are moved out of alignment in order to enable the undercarriage to pivot towards its retracted position under the action of a drive actuator.

Undercarriages are known in which the drive actuator is a rotary actuator acting on one of the elements of the foldable brace. The drive actuator is generally fastened to the structure of the aircraft and drives one of the elements of the foldable brace either directly, or else via a linkage. The structure of the aircraft then needs to be designed so as to take up the forces and the torque that are developed by the drive actuator when driving the undercarriage.

OBJECT OF THE INVENTION

An object of the invention is to propose an undercarriage installation that relieves the structure of the aircraft while driving the undercarriage.

SUMMARY OF THE INVENTION

In order to achieve this object, the invention provides an aircraft undercarriage having a leg pivotally mounted on a structure of the aircraft to pivot about a pivot axis between a deployed position and a retracted position, the undercarriage including a foldable brace comprising two hinged-together elements, one of which is hinged to the leg and the other of which is hinged to the structure of the aircraft, in such a manner that when the leg is in the deployed position, the two brace elements are locked together in a substantially aligned position, the undercarriage also being provided with a rotary drive actuator having an outlet shaft acting on one of the elements of the foldable brace in order to cause the leg to pivot between its two positions. According to the invention, the drive actuator is pivotally mounted on the structure of the aircraft to pivot about an axis of rotation of the outlet shaft, the drive actuator having a casing connected by a reaction rod to the leg in order to take up the force developed by the drive actuator when driving the undercarriage.

By means of the provisions of the invention, the torque developed by the drive actuator is not transmitted to the structure of the aircraft, but is taken up by the undercarriage itself.

In a particular embodiment of the invention, when the undercarriage is in the deployed position, the reaction rod is in alignment with the pivot axis of the leg. Thus, in the event of the undercarriage moving or being deformed, e.g. during landing, the rod cannot exert a moment on the casing of the drive actuator that could lead to the foldable brace being unlocked.

In another particular embodiment of the invention, the outlet shaft of the drive actuator acts on the element of the foldable brace via a toggle lock that locks together the elements of the foldable brace in the aligned position while the undercarriage is in the deployed position.

SUMMARY OF THE FIGURES

The invention can be better understood in the light of the following description of particular embodiments of the invention, given with reference to the figures of the accompanying drawings, in which.

DETAILED DESCRIPTION OF PARTICULAR EMBODIMENTS OF THE INVENTION

Figure 1:
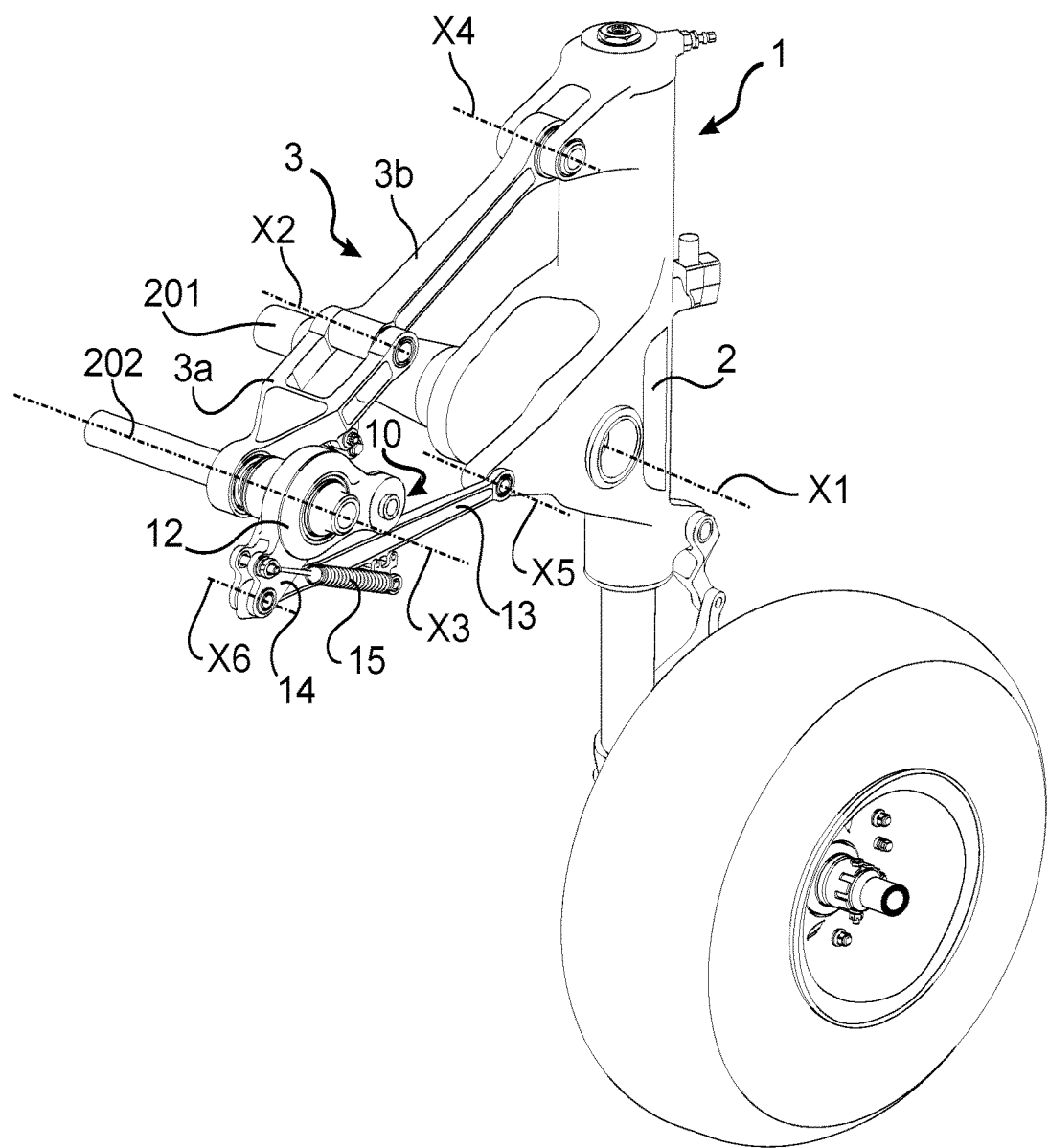
FIG. 1 is a perspective view of an undercarriage in a first particular embodiment of the invention, shown in the deployed position.
Figure 2:
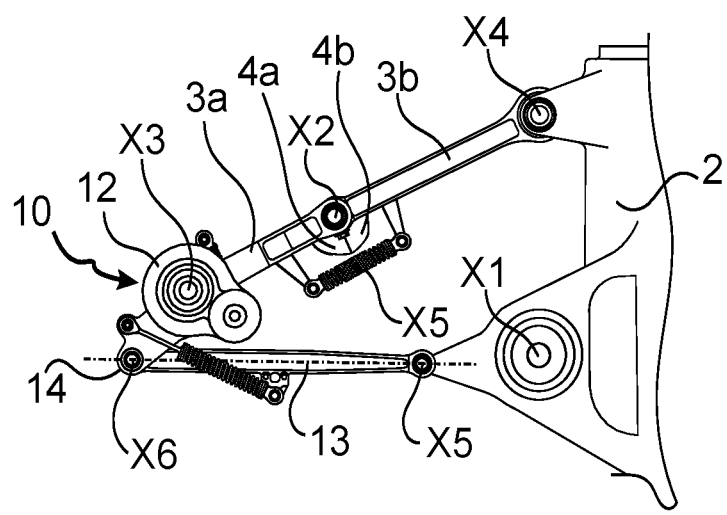
FIG. 2 is a fragmentary side view of the FIG. 1 undercarriage, shown in the deployed position.
Figure 3:
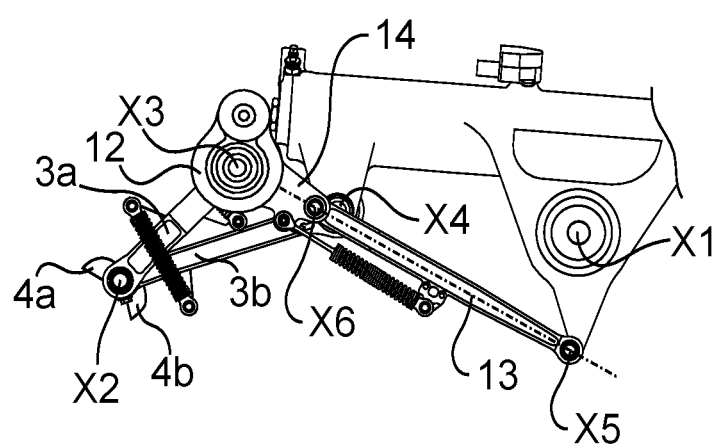
FIG. 3 is a fragmentary side view of the FIG. 1 undercarriage, shown in the retracted position.
Figure 4:
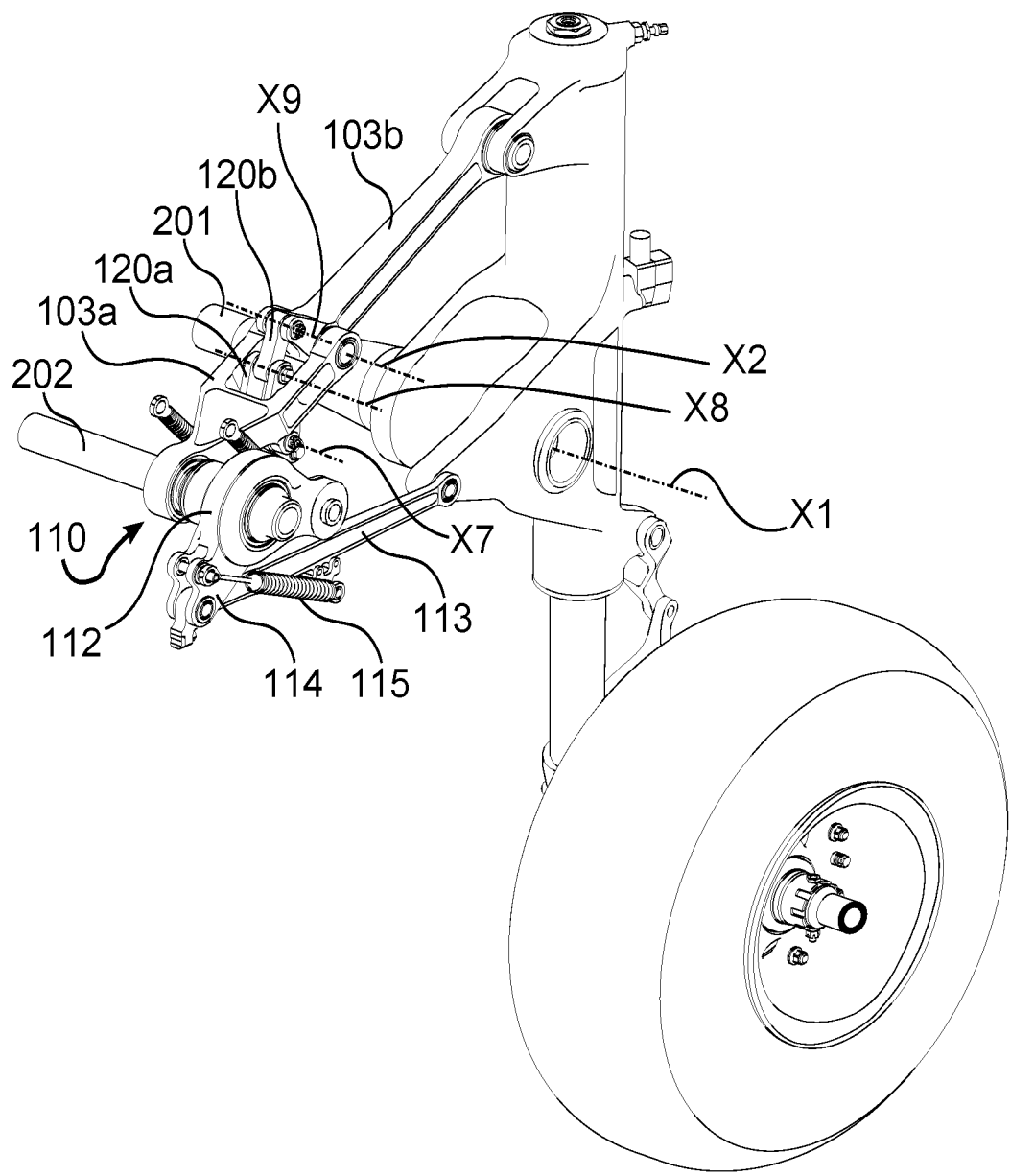
FIG. 4 is a perspective view of an undercarriage in a second particular embodiment of the invention, shown in the deployed position.
Figure 5:
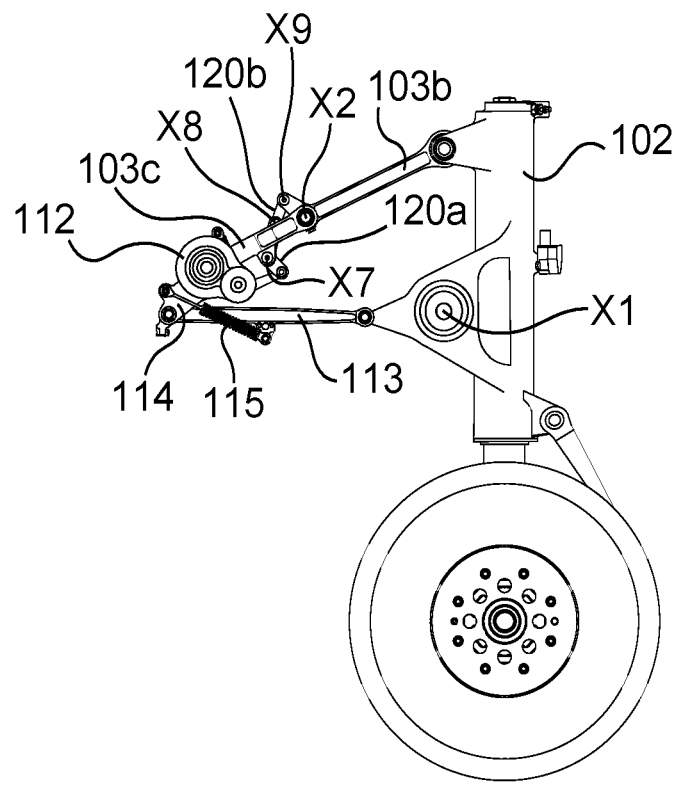
FIG. 5 is a side view of the FIG. 4 undercarriage shown in the deployed position.
Figure 6:
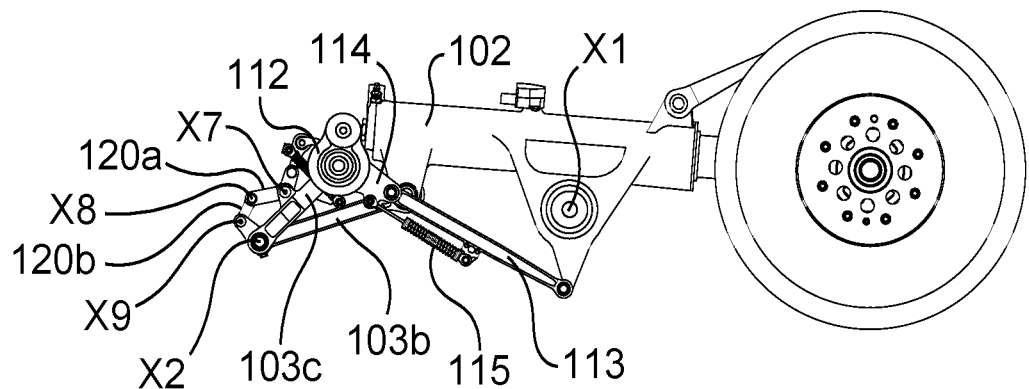
FIG. 6 is a side view of the FIG. 4 undercarriage shown in the retracted position.
Figure 7:
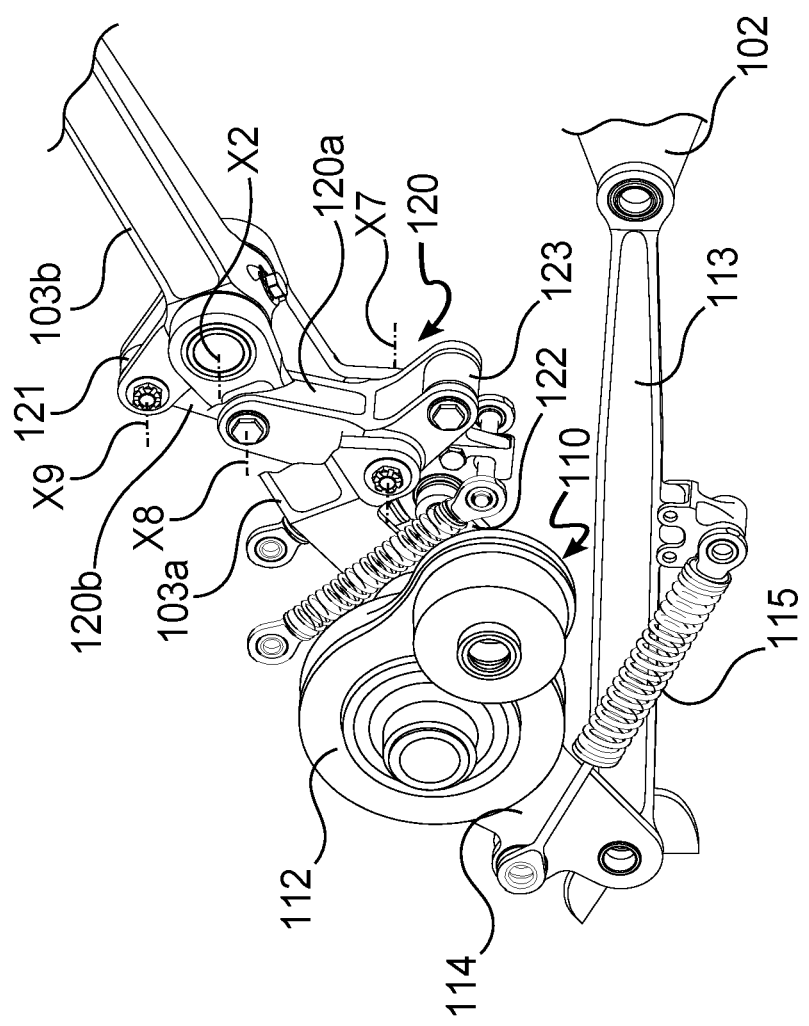
FIG. 7 is a fragmentary perspective view of the lock fitted to the foldable brace of the FIG. 4 undercarriage.
Figure 8:
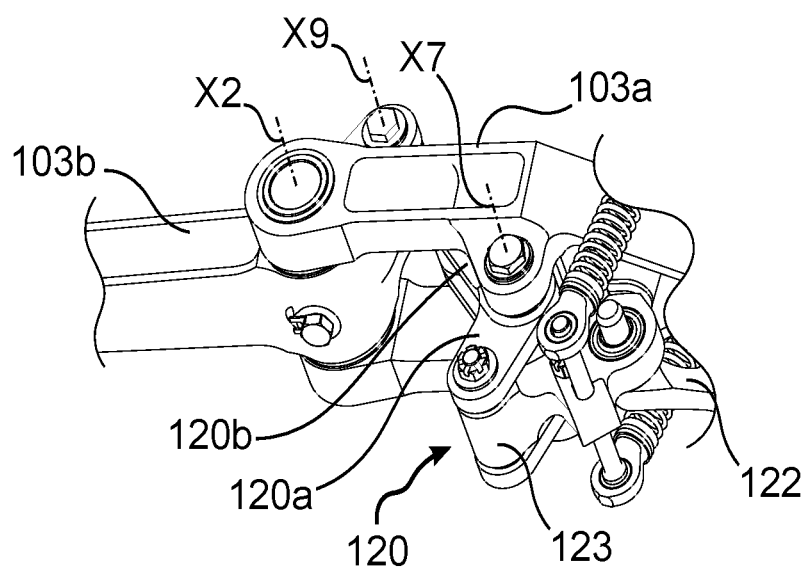
FIG. 8 is another fragmentary perspective view of the lock fitted to the foldable brace of the FIG. 4 undercarriage.

With reference to FIGS. 1 to 3, and in accordance with a first particular embodiment of the invention, the undercarriage 1 comprises a leg 2 that is hinged to the structure of an aircraft (not shown) via a pivot 201 about a pivot axis X1 that is substantially horizontal in this example, so as to be movable between a deployed position shown in FIGS. 1 and 2 and a retracted position shown in FIG. 3. Below, all of the hinges mentioned have a pivot axis perpendicular to the plane of the figure, such that the pivot axes are all parallel to one another.

The undercarriage 1 includes a foldable brace 3 made up of two brace elements 3a and 3b that are hinged together at a knee having a pivot axis X2. The first brace element 3a is hinged to the structure of the aircraft via a pivot 202 about a pivot axis X3, while the second brace element 3b is hinged to the leg 2 about a pivot axis X4. In the deployed position, the two brace elements 3a and 3b, and thus the pivot axes X2, X3, and X4 are substantially in alignment. This position is defined by respective abutments 4a and 4b of the brace elements 3a and 3b, and it is confirmed by means of a confirmation spring 5 coupled to the two brace elements 3a and 3b in order to confirm contact between the abutments 4a and 4b.

A rotary drive actuator 10 is arranged on the pivot axis X3 so that its outlet shaft rotates about the pivot axis X3. The outlet shaft (not shown) is directly connected to the first brace element 3a. The drive actuator 10 has a casing 12 that is mounted to rotate freely about the axis X3. A reaction rod 13 is hinged about two pivot axes X5 and X6 firstly to the leg 2 and secondly to a crank 14 secured to the casing 12.

Thus, when the rotary drive actuator 10 is powered, its outlet shaft causes the second brace element 3b to turn about the axis X3. The reaction torque is taken up by the reaction rod 13, but no torque is transmitted to the structure of the aircraft.

It should be observed that in the deployed position as shown in FIGS. 1 and 2, the reaction rod 13 is in line with the pivot axis X1 of the hinge of the leg 2, i.e. the pivot axes X1, X5, and X6 are in alignment. In the event of the leg 2 being deformed or subjected to interfering movement, e.g. during the impact of a landing, this configuration avoids the reaction rod 13 being able to cause the casing 12 to turn in such a manner as to unlock the foldable brace in untimely manner.

In order to retract the leg, it suffices to turn the outlet shaft of the actuator in the direction that tends to move the abutments 4a and 4b apart from each other, against the spring 5, thereby breaking the alignment of the foldable brace 3 and allowing the leg to pivot under traction exerted by the first brace element 3a, which is itself turned by the outlet shaft of the rotary drive actuator 10. The movement continues until reaching the position shown in FIG. 3. In this figure, it can be seen that the reaction rod 13 is in line with the pivot axis X3, i.e. that the pivot axes X3, X5, and X6 are in alignment, thereby ensuring that the leg 2 is stabilized in the retracted position. In this position, the crank 14 and the reaction rod 13 are in alignment. The position of the alignment is preferably defined by abutments that are secured respectively to the reaction rod 13 and to the crank 14 and that come into contact with each other in the aligned position. This position is confirmed by a confirmation spring 15 coupled between the reaction rod 13 and the crank 14.

In the movement from the deployed position to the retracted position, only the pivot axes X1 and X2 (which correspond to the pivots 201 and 202 on the structure of the aircraft) remain stationary in position. All of the other axes move, parallel to themselves. The casing 12 and the actuator 10 and the leg 2 are turned through about one-fourth of a turn.

In a second embodiment shown in FIGS. 4 to 8, where elements that are common with the above-described embodiments are given the same references plus one hundred, the outlet shaft of the drive actuator 110 is no longer directly connected to the first brace element 103a, but to a toggle lock 120 serving to lock the foldable brace 103 in the aligned position.

The toggle lock 120 has a first locking element 120a that is hinged to the first brace element 103a about a pivot axis X7, and that is hinged to a second locking element 120b about a pivot axis X8, itself hinged to a crank 121 of the second brace element 103b about a pivot axis X9. In the locked position, which corresponds to the deployed position of the undercarriage, the pivot axes X7, X8, and X8 are substantially in alignment. This position is defined by internal abutments (not shown) that perform the same role as the abutments 4a and 4b. Holding the locking elements 120a and 120b in the aligned position ensures that the brace elements 103a and 103b are held in the aligned position.

As above, the casing 112 of the rotary drive actuator 110 includes a crank 114 connected to the leg 102 by a reaction rod 113.

The outlet shaft has a control crank 122 that is coupled to the first locking element 120a by a link 123. Starting from the deployed position shown in FIG. 4, powering the rotary drive actuator 110 causes the outlet shaft to pull on the link 123 via the crank 122. This traction causes the locking elements 120a and 120b to move out of alignment, thereby moving the brace elements 103a and 103b out of alignment. The remainder of the movement towards the retracted position is then identical to that in the above-described embodiment, except that the outlet shaft of the raising actuator 110 is not directly connected to one of the brace elements, but is connected thereto via the locking elements 120a, 120b, with the rotary drive actuator 110 thus serving both to unlock and move the foldable brace out of alignment, and also to raise the leg.

In the same manner as above, the raising torque developed by the drive actuator 110 is transmitted by the reaction rod 113 to the leg 102, thereby taking load off the structure of the aircraft.

The invention claimed is:

1. An aircraft undercarriage having a leg (2; 102) pivotally mounted on a structure of the aircraft to pivot about a pivot axis (X1) between a deployed position and a retracted position, the undercarriage including a foldable brace (3a, 3b; 103a, 103b) comprising two hinged-together elements, one of which is hinged to the leg and the other of which is hinged to the structure of the aircraft, in such a manner that when the leg is in the deployed position, the two brace elements are locked together in a substantially aligned position, the undercarriage also being provided with a rotary drive actuator (10; 110) having an outlet shaft acting on one of the elements of the foldable brace in order to cause the leg to pivot between its two positions, the undercarriage being characterized in that the drive actuator is pivotally mounted on the structure of the aircraft to pivot about an axis of rotation (X3) of the outlet shaft, the drive actuator having a casing (12; 112) connected by a reaction rod (13; 113) to the leg in order to take up the force developed by the drive actuator when driving the undercarriage.

2. An undercarriage according to claim 1, wherein the outlet shaft of the drive actuator (12) is connected directly to one of the brace elements (3a, 3b).

3. An undercarriage according to claim 2, wherein the outlet shaft of the drive actuator (112) is connected to the brace elements via locking elements (120a, 120b) for locking the brace elements in the aligned position when the undercarriage is in the deployed position.

4. An undercarriage according to claim 1, wherein the axis of rotation of the outlet shaft of the actuator coincides with a pivot axis (X3) of the foldable brace (3) relative to the structure of the aircraft.

* * * * *